United States Patent
Mir

(10) Patent No.: US 7,839,106 B2
(45) Date of Patent: Nov. 23, 2010

(54) SYSTEM AND METHODS INVOLVING DYNAMIC CLOSED LOOP MOTOR CONTROL AND FLUX WEAKENING

(75) Inventor: Sayeed A. Mir, Saginaw, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 436 days.

(21) Appl. No.: 12/042,786

(22) Filed: Mar. 5, 2008

(65) Prior Publication Data

US 2009/0224710 A1    Sep. 10, 2009

(51) Int. Cl.
*H02P 21/00* (2006.01)

(52) U.S. Cl. .................. 318/400.02; 318/432

(58) Field of Classification Search .......... 318/432, 318/400.01, 400.02, 727, 811, 599
See application file for complete search history.

(56) References Cited

U.S. PATENT DOCUMENTS

| | | | |
|---|---|---|---|
| 5,739,664 A * | 4/1998 | Deng et al. | 318/808 |
| 6,396,229 B1 * | 5/2002 | Sakamoto et al. | 318/400.02 |
| 7,049,782 B2 * | 5/2006 | Chen et al. | 318/609 |
| 2006/0069555 A1 | 3/2006 | Konda et al. | |
| 2007/0052381 A1 * | 3/2007 | Ueda et al. | 318/432 |
| 2007/0090782 A1 * | 4/2007 | Endo et al. | 318/432 |

* cited by examiner

*Primary Examiner*—Rina I Duda
(74) *Attorney, Agent, or Firm*—Cantor Colburn LLP

(57) ABSTRACT

A method for controlling motor, the method including, receiving a motor torque command, calculating a first current associated with the motor torque command, calculating an estimated first current responsive to receiving a first regulated voltage associated with the first current and a motor speed signal, subtracting the estimated first current from the first current resulting in a first current error signal, and outputting the first regulated voltage to a voltage controller responsive to receiving the first current error signal, the estimated first current, and the motor speed signal.

16 Claims, 2 Drawing Sheets

SYSTEM AND METHODS INVOLVING DYNAMIC CLOSED LOOP MOTOR CONTROL AND FLUX WEAKENING

BACKGROUND

One method of controlling motors in systems, such as, for example power steering systems is to use current sensors that provide feedback for closed loop torque control. However, the use of current sensors adds components and feedback processing to the system. Another method of controlling motors is to calculate voltage inputs that will result in desired torque outputs using a motor model based approach. In the model based approach, the current sensors are not used.

SUMMARY

The above described and other features are exemplified by the following Figures and Description in which a power steering system is disclosed that includes:

An exemplary method for controlling a motor, the method including, receiving a motor torque command, calculating a first current associated with the motor torque command, calculating an estimated first current responsive to receiving a first regulated voltage associated with the first current and a motor speed signal, subtracting the estimated first current from the first current resulting in a first current error signal, and outputting the first regulated voltage to a voltage controller responsive to receiving the first current error signal, the estimated first current, and the motor speed signal.

An exemplary embodiment of a system for controlling a motor comprising, a processor operative to calculate a first current associated with the motor torque command, calculate an estimated first current responsive to receiving a first regulated voltage associated with the first current and a motor speed signal, subtract the estimated first current from the first current resulting in a first current error signal, and output the first regulated voltage to a voltage controller responsive to receiving the first current error signal, the estimated first current, and the motor speed signal.

An alternate exemplary method of controlling a motor comprising, receiving a motor torque command, calculating a first current associated with the motor torque command, calculating a second current for reducing the back electromagnetic flux of the motor as a function of the first current, a motor speed signal, and a input system voltage, calculating a first regulated voltage associated with the first current and the motor speed signal, calculating a second regulated voltages associated with the second current and the motor speed signal, outputting the first regulated voltage and the second regulated voltage to a voltage controller.

BRIEF DESCRIPTION OF THE DRAWINGS

Referring now to the Figures wherein like elements are numbered alike.

DETAILED DESCRIPTION

Figure 1:
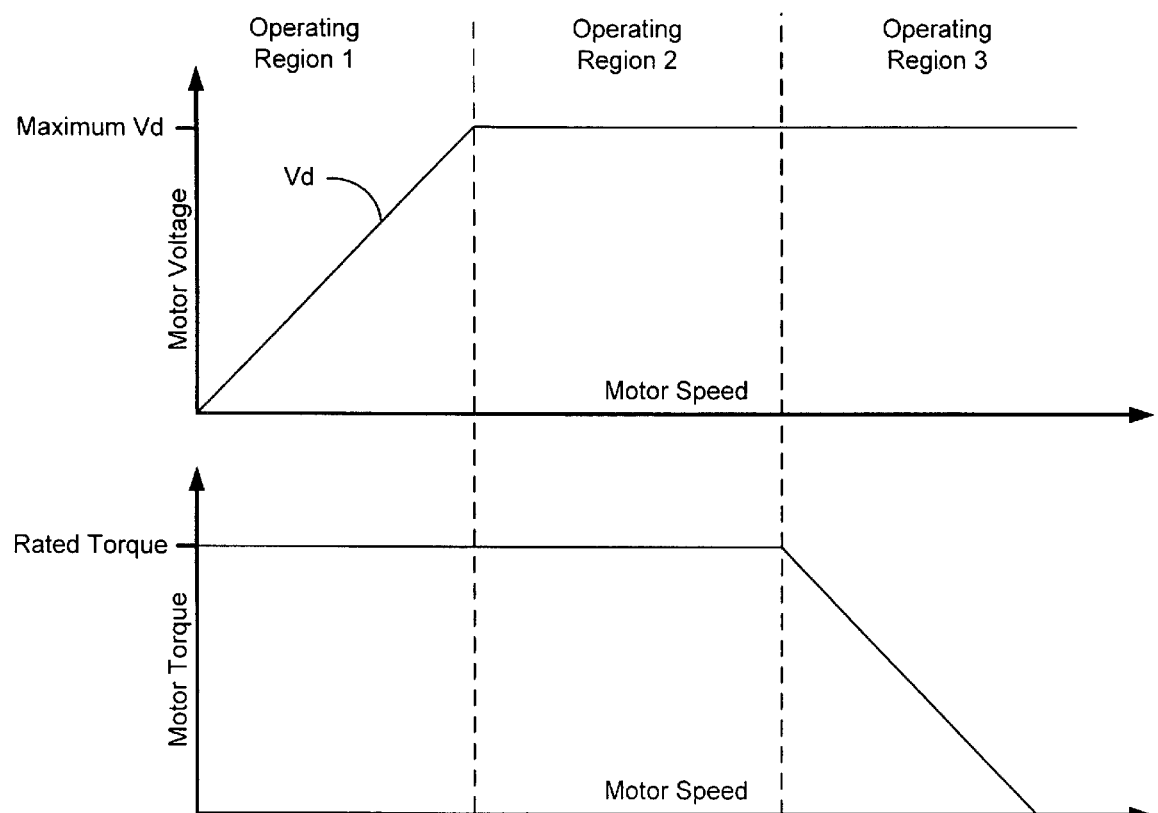
FIG. 1 illustrates an example of a flux weakening voltage output graph.

Control systems often use motor current sensors to provide closed loop feedback to the system. The feedback of the current sensors is used with an input voltage to control the torque output of a motor. The use of feedback from current sensors offers transient control of the motor, however the use of current sensors adds additional components to the system.

Another method of controlling a motor system is by calculating the motor voltage that can generate the desired torque output for a given motor. Since the specifications of a motor used in a system may be used to calculate a torque output of the motor at a given input voltage, the motor may be controlled without current feedback. The control is performed at steady states of the motor, such that transient responses of the motor are not accounted in the control. Such a system is advantageous because it decreases the number of components in the system and the processing used in closed loop systems. A disadvantage of using steady state control is that response times (phase lag) may be greater resulting in system instability. In large control systems, shorter phase lags that are often associated with closed loop systems that control transient responses are desired.

Some motor systems use a limited to a maximum input voltage, such as, for example, 12 Vdc. Since motors operate with a voltage input to generate torque, once a given maximum input voltage for a system is reached, the speed and torque of a motor may be limited by the back electromagnetic flux (EMF) in the motor. A method for increasing the torque output of a motor in a system having a limited input voltage is called flux weakening.

Back EMF is a product of motor speed and flux. As motor speed increases, the back EMF voltage increases. Once a maximum voltage input for a system is reached, the flux may be reduced by inducing a current in a direction opposite to the flux in the motor. Using a vector control method, the toque producing current (iq) and flux weakening current (id) can be calculated for a given torque and speed. The operation of motor can be divided into three regions illustrated in FIG. 1. In region 1, the voltage applied to a given motor is less than the maximum voltage limit at a particular motor speed to result in the desired toque. As the speed of the motor increases, the voltage needed to achieve the desired torque from the motor at the motor speed becomes is greater than the maximum voltage limit of the motor. The operation transitions into region 2. In this region, flux weakening is applied to reduce the back emf voltage. In region 2, the rated torque of the motor can be achieved with the field weakening applied. As the speed of the motor is further increased, the motor reaches the rated limit, and the rated motor torque cannot be achieved even with the field weakening. The operation transitions into region 3. In region 3, torque produced current and flux weakening current of the motor is optimized to get the maximum torque of the motor. The output torque of the motor is less than the desired torque. The flex weakening current id may be calculated from a table as a function of motor speed.

One disadvantage of using a table to determine id values is that a table has discrete outputs for given inputs that may inefficiently limit the flux weakening of the motor. The optimum value of id is also not given by a table because id is a nonlinear function of iq and speed of the motor.

Figure 2:
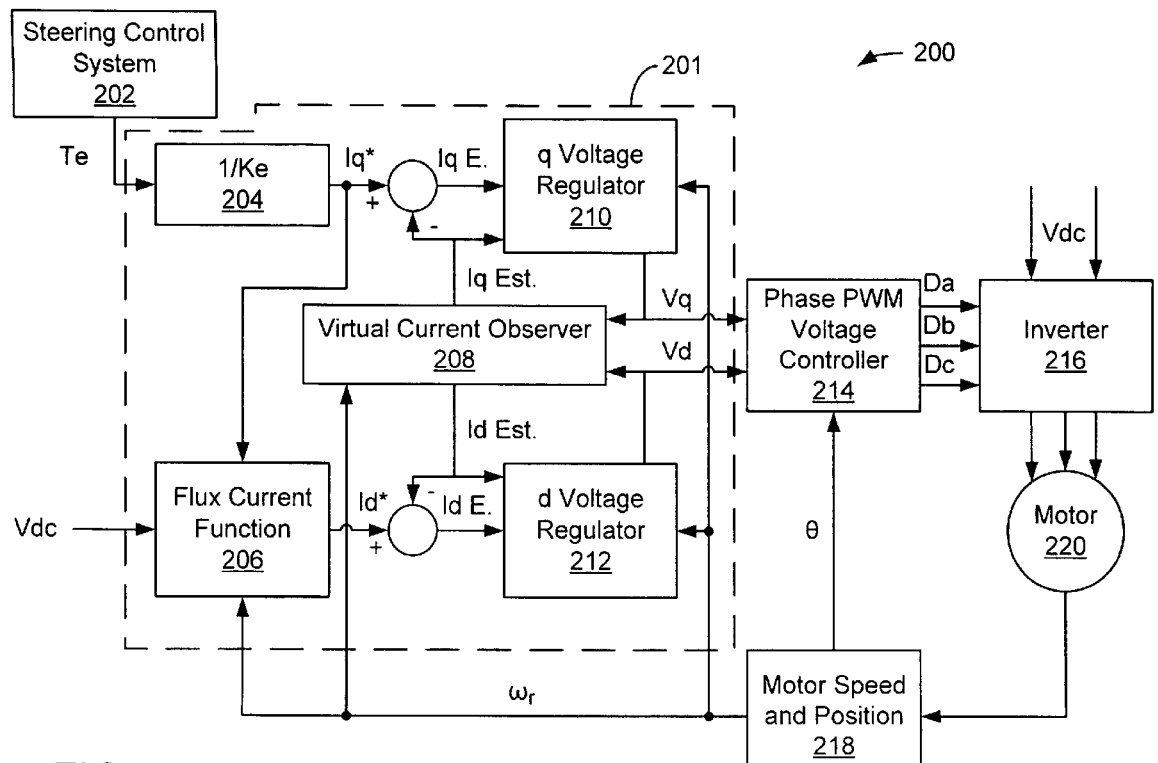
FIG. 2 illustrates a system for controlling a motor.

FIG. 2 illustrates an exemplary embodiment of a control system 200. The system 200 is used to control a motor 220 by incorporating the advantages of flux weakening and current feedback loops while maintaining the simplicity of controlling the motor 220 without current sensors.

The system 200 may be used in a system such as, for example, a power steering system. The system 200 includes a processor 201 that is operative to receive a desired motor torque command (Te) from a source such as, for example, a steering control system 202. The desired motor torque command is used to calculate a current $i_q^*$ where Ke is the back EMF constant of the motor 220 as shown in block 204. The calculation of $i_q^*$ is shown in equation (1).

$$i_q^* = \frac{T_e}{K_e} \quad (1)$$

The processor then calculates an $i_d^*$ current for flux weakening in the motor 220. The $i_d^*$ is calculated from a function of the motor speed ($\omega_r$), the input voltage (Vdc) and $i_q^*$ in block 206. The function shown in equation (2) will be further discussed below.

$$i_d^* = f(\omega_r, Vdc, i_q^*) \quad (2)$$

A virtual current observer 208 calculates an estimated motor current ($i_q$ Est.) associated with the motor torque command and an estimated flux weakening current ($i_d$ Est.). Since the motor 220 specifications are known, the virtual current observer can estimate the currents in the motor 220 based in part on the input voltages to the motor. Once the estimated currents are calculated, they may be used in feedback loops. This allows the system to control the transient responses of the motor 220 without using current sensors. The equations for $i_q$ Est. and $i_d$ Est. are derived from equations (3) and (4) below.

$$V_q = r i_q + \omega_r L_d i_d + K_e \omega_r + p L_q i_q \quad (3)$$

$$V_d = r i_d - \omega_r L_q i_q + p L_d i_d \quad (4)$$

Where r is the motor 220 resistance, $L_d$ is the motor 220 inductance, and p is a differential d/dt. Rearranging the equations results in:

$$p i_q = \frac{V_q - K_e \omega_r - r i_q + \omega_r L_d i_d}{L_q} \quad (5)$$

$$p i_d = \frac{V_d - r i_d + \omega_r L_q i_q}{L_d} \quad (6)$$

Writing the equations in digital form using T as the time period results in virtual current observer equations:

$$i_q(n) = i_q(n-1) + T_s \left( \frac{V_q(n-1) - K_e \omega_r(n-1) - r i_q(n-1) - 3(\omega_r(n-1) L_d i_d(n-1))}{L_q} \right) \quad (7)$$

$$i_d(n) = i_d(n-1) + T_s \left( \frac{V_d(n-1) - r i_d(n-1) + 3(\omega_r(n-1) L_q i_q(n-1))}{L_d} \right) \quad (8)$$

where n is a cycle.

Once the virtual current observer 208 outputs the $i_q$ Est. and $i_d$ Est., the values are subtracted from $i_q^*$ and $i_d^*$ shown in equations (9) and (10) below.

$$E(i_q^*) = i_q^* - i_q(n) \quad (9)$$

$$E(i_d^*) = i_d^* - i_d(n) \quad (10)$$

Yielding error signals $i_q$ Error ($i_q$ E.) and $i_d$ Error ($i_d$ E.).

The voltage regulator 210 receives $i_q$ E., $i_q$ Est., and $\omega_r$ to calculate the Vq voltage, and the voltage regulator 212 $i_d$ E., $i_d$ Est., and $\omega_r$ to calculate the Vd voltage. The equations (11) and (12) used to calculate Vq and Vd are shown below.

$$V_q = G_p E(i_q) + G_i \int E(i_q) dt + \omega_r(n) \cdot (K_e + L_d i_d(n)) \quad (11)$$

$$V_d = G_p E(i_d) + G_i \int E(i_d) dt - \omega_r(n) \cdot (L_q i_q(n)) \quad (12)$$

Gp and Gi are control constants. The values of the control constants are tuned to result in a desired response.

In the illustrated embodiment, the motor 220 is a three phase motor that is controlled by a phase pulse width modulation voltage controller 214. The phase voltage is determine by equations (13), (14), and (15).

$$V_a = V_q \sin(\theta) + V_d \cos(\theta) \quad (13)$$

$$V_b = V_q \sin\left(\theta - \frac{2\pi}{3}\right) + V_d \cos\left(\theta - \frac{2\pi}{3}\right) \quad (14)$$

$$V_c = V_q \sin\left(\theta - \frac{2\pi}{3}\right) + V_d \cos\left(\theta - \frac{2\pi}{3}\right) \quad (15)$$

The duty cycle for the motor is calculated by the phase pulse width modulation voltage controller 214 by equations (16), (17), and (18).

$$D_a = \frac{V_a}{V_{dc}} \cdot P_{PWM} \quad (16)$$

$$D_b = \frac{V_b}{V_{dc}} \cdot P_{PWM} \quad (17)$$

$$D_c = \frac{V_c}{V_{dc}} \cdot P_{PWM} \quad (18)$$

The phase pulse width modulation voltage controller 214 outputs the duty cycles to an inverter 216 that inverts the duty cycles, multiplies the duty cycles by the Vdc, and outputs the three phases of voltage to the motor 220.

The function used to calculate $i_d^*$ (the d-axis current—flux weakening current) is derived below. Equations (19) and (20) are used to calculate the Vq and Vd voltages for a pulse with modulation motor.

$$V_q = r i_q + \omega_r L_d i_d + K_e \omega_r \quad (19)$$

$$V_d = r i_d - \omega_r L_q i_q \quad (20)$$

if $$V_{dc} = \sqrt{V_q^2 + V_d^2} \quad (21)$$

let $r^2 + \omega_r^2 L^2 = Z^2$ where $L_q = L_d = L$ may be solved to result in:

if $L_q = L_d = L$ than $$i_d^* = -\frac{\omega_r \omega L K_e}{z^2} + \sqrt{\left[\frac{\omega_r \omega L K_e}{z^2}\right]^2 - i_q^{*2} - \frac{2r\omega K_e i_q^* + \omega^2 K_e^2 - V_{dc}^2}{z^2}} \quad (23)$$

$$S = \left[\frac{\omega_r \omega L K_e}{z^2}\right]^2 - i_q^{*2} - \frac{2r\omega K_e i_q^* + \omega^2 K_e^2 - V_{dc}^2}{z^2},$$

if $(S < 0)$, than set $S = 0$ and,

-continued $$i_d^* = -\frac{\omega_r \omega L K_e}{z^2} \text{else,} \quad (24)$$

$$i_d^* = \frac{1}{2}\left(-\frac{2r\omega_r K_e}{z^2} + \sqrt{\left(\frac{2r\omega_r K_e}{z^2}\right)^2 - 4\left(\frac{\omega_r^2 K_e^2 - V_{dc}^2}{z^2} - \left(\frac{\omega_{r\_ele}\omega_r L_q K_e}{z^2}\right)^2\right)}\right)$$

Where $i_d$ is always positive such that if $i_d^* \leq 0$ than $i_d^* = 0$. The $i_d^*$ value in equation where S>0 is used to calculate the $i_d^*$ value in the first and second operating regions of the motor, as shown in FIG. 1, while if (S<0), than set S=0 and the motor is operating in the third operating region.

The illustrated embodiment of FIG. 2 utilizes a flux weakening current function to allow more efficient use of the motor 220. The use of the virtual current observer 208 allows the current in the motor to be estimated based on an input voltage. With estimated currents, the system 200 may control the motor 220 using feedback loops that accommodate transient state control.

What is claimed is:

1. A method for controlling a motor, the method including:
   receiving a motor torque command;
   calculating a first current associated with the motor torque command;
   calculating an estimated first current responsive to receiving a first regulated voltage associated with the first current and a motor speed signal;
   subtracting the estimated first current from the first current resulting in a first current error signal; and
   outputting the first regulated voltage to a voltage controller responsive to receiving the first current error signal, the estimated first current, and the motor speed signal.

2. The method of claim 1, wherein the first current equals the torque command divided by a back electromagnetic flux of the motor.

3. The method of claim 1, wherein the method further comprises calculating a second current for reducing the back electromagnetic flux of the motor as a function of the first current, the motor speed signal, and a input system voltage.

4. The method of claim 3, wherein the method further comprises:
   calculating an estimated second current responsive to receiving a second regulated voltage associated with the second current and the motor speed signal;
   subtracting the estimated second current from the second current resulting in a second current error signal; and
   outputting the second regulated voltage to the voltage controller responsive to receiving the second current error signal, the estimated second current, and the motor speed signal.

5. The method of claim 1, wherein the method further comprises:
   calculating a phase duty cycle responsive to receiving the first regulated voltage;
   inverting the phase duty cycle; and
   outputting a product of the inverted phase duty cycle and the input system voltage to the motor.

6. The method of claim 4, wherein the method further comprises calculating a phase duty cycle responsive to receiving the first regulated voltage and the second regulated voltage.

7. The method of claim 6, wherein the method further comprises:
   inverting the phase duty cycle; and
   outputting a product of the inverted phase duty cycle and the input system voltage to the motor.

8. A system for controlling a motor comprising:
   a processor operative to calculate a first current associated with a motor torque command, calculate an estimated first current responsive to receiving a first regulated voltage associated with the first current and a motor speed signal, subtract the estimated first current from the first current resulting in a first current error signal, and output the first regulated voltage to a voltage controller responsive to receiving the first current error signal, the estimated first current, and the motor speed signal.

9. The system of claim 8, wherein the first current equals the torque command divided by a back electromagnetic flux of the motor.

10. The system of claim 8, wherein processor is further operative to calculate a second current for reducing the back electromagnetic flux of the motor as a function of the first current, the motor speed signal, and a input system voltage.

11. The system of claim 10, wherein processor is further operative to calculate an estimated second current responsive to receiving a second regulated voltage associated with the second current and the motor speed signal, subtract the estimated second current from the second current resulting in a second current error signal, and output the second regulated voltage to the voltage controller responsive to receiving the second current error signal, the estimated second current, and the motor speed signal.

12. The system of claim 8, wherein the system further comprises a voltage controller operative to calculate a phase duty cycle responsive to receiving the first regulated voltage.

13. The system of claim 12, wherein the system further comprises an inverter operative to invert the phase duty cycle and to output a product of the inverted phase duty cycle and the input system voltage to the motor.

14. A method of controlling a motor comprising:
    receiving a motor torque command;
    calculating a first current associated with the motor torque command;
    calculating a second current for reducing the back electromagnetic flux of the motor as a function of the first current, a motor speed signal, and a input system voltage;
    calculating a first regulated voltage associated with the first current and the motor speed signal;
    calculating a second regulated voltages associated with the second current and the motor speed signal; and
    outputting the first regulated voltage and the second regulated voltage to a voltage controller.

15. The method of claim 14, wherein the method further comprises calculating a phase duty cycle responsive to receiving the first regulated voltage and the second regulated voltage.

16. The method of claim 15, wherein the method further comprises:
    inverting the phase duty cycle; and
    outputting a product of the inverted phase duty cycle and the input system voltage to the motor.

\* \* \* \* \*